Dec. 8, 1931.   E. W. SHAW   1,835,436
TRAILER
Filed Jan. 16, 1928    3 Sheets-Sheet 1

*Inventor*
*Edward Wharton Shaw*

*Attorney*

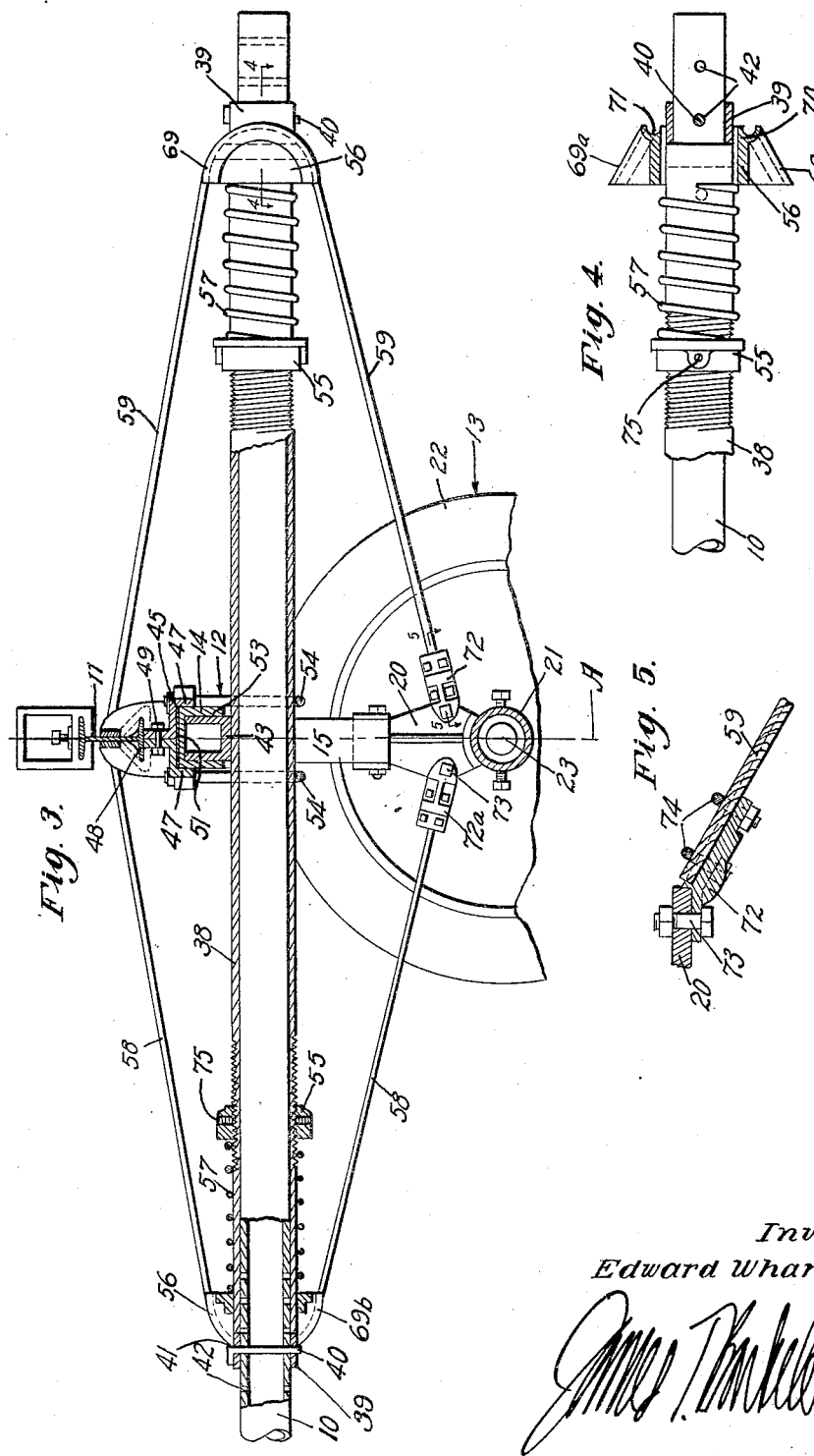

Dec. 8, 1931.   E. W. SHAW   1,835,436
TRAILER
Filed Jan. 16, 1928   3 Sheets-Sheet 3
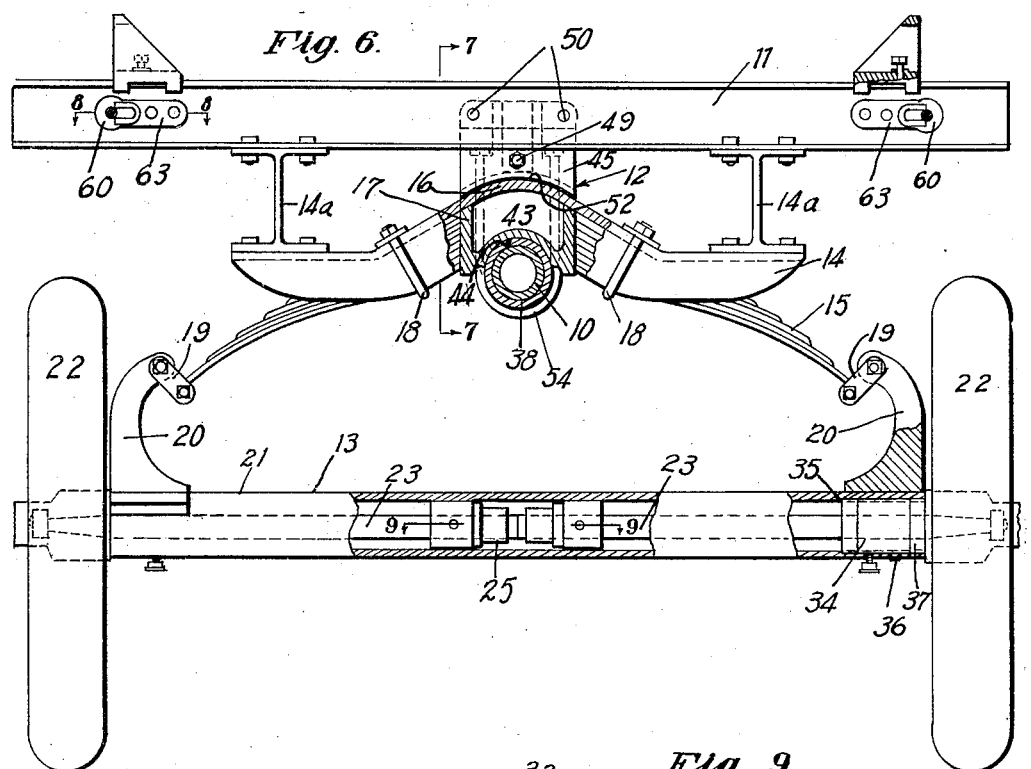
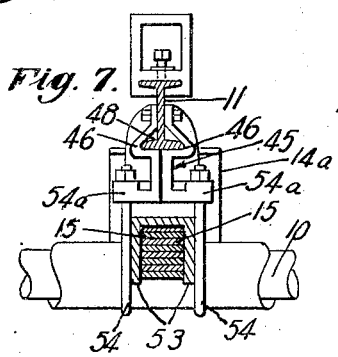
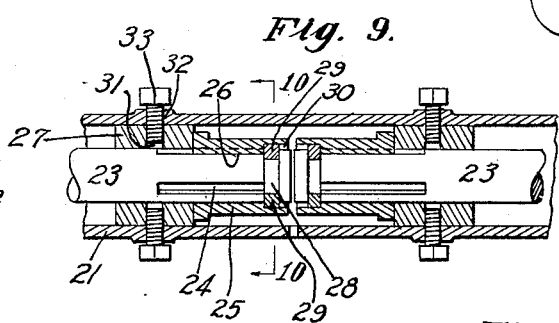
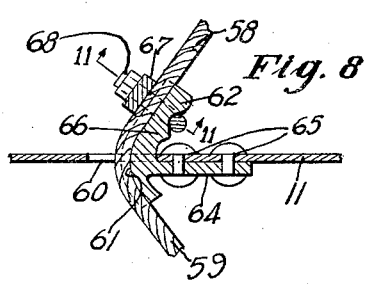
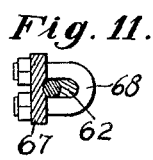
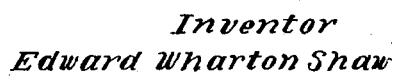
*Inventor*
*Edward Wharton Shaw*
*Attorney*

Patented Dec. 8, 1931

1,835,436

UNITED STATES PATENT OFFICE

EDWARD WHARTON SHAW, OF IMPERIAL BEACH, CALIFORNIA

TRAILER

Application filed January 16, 1928. Serial No. 247,090.

This invention has to do generally with trailers and is more particularly concerned with so called semi-trailers, that is, two-wheeled trailers having their forward ends supported on the towing vehicle. However, it will be understood that certain novel features of the device are as readily and advantageously adaptable to trailers of the four-wheel type, and therefore my invention, considered in its broader aspects, is not limited to embodiment in two-wheeled trailers.

Generally, it is the object of my invention to provide a trailer of extremely simple and sturdy construction which is well adapted to withstand the exceedingly severe service conditions to which devices of this character are exposed.

One of the main features of the trailer is the provision of a balanced tensioning system whereby the running gear and body portion of the trailer are connected in a manner to utilize to full advantage the normal spring action of the rear end and yet take up or absorb abnormal road shocks or the like without exposing the usual springs to undue twisting strains.

While this feature is particularly of advantage where a pole type of trailer is used, (and this is the type here illustrated), this tensioning may be used to advantage in other constructions, and therefore such of my claims as do not specify this particular type of trailer construction are not to be construed as limited to the illustrated embodiment. However, I have shown and will describe with some particularity a certain type of trailer wherein the running gear is connected to the leading vehicle through a single, centrally arranged draft pole, the draft pole supporting a load taking bolster which preferably, though not necessarily, has a companion bolster supported in parallelism therewith at the forward end of the pole.

The bolster and pole are connected to the running gear through a spring which is transversely arranged with respect to the longitudinal axis of the pole, and is standard to a certain make of car. With the elements so arranged, road shocks and shocks arising from sudden stopping and starting or backing against obstructions have a decided tendency to rock the running gear beneath the bolster and to impose severe distorting or twisting strains upon the supporting springs, with obviously undesirable effect. To offset these strains it is desirable that tension members be applied between the bolster and running gear, and in order that these tension members may be of sufficient longitudinal extent to be fully effective and to offset strains arising through backing of the trailer, it is desirable that they extend to the pole at opposite sides of the running gear. In order to allow a certain amount of movement of the axle longitudinally of the pole so undue rigidity may not lead to fracture or over-strain, it is essential that the tension members be capable of limited yielding movement against spring tension. This precludes the use of rigidly connected radius rods, and I have therefore employed tension members which are capable of longitudinal movement limited by heavy springs, so bodily displacement of the axle longitudinally of the pole, due to road shocks, etc., is counteracted by an increase in tension at one side or the other and a consequent yieldable checking of the movement; it being understood that the normal tendency of the tension members is to support the running gear in balanced condition, that is, the axis of rotation of the wheels substantially in direct alinement with the supporting springs.

As a further feature, I have utilized flexible tensioning members in lieu of radius rods, as such a substitution is preferable from the standpoint of cost of installation and maintenance as well as from the standpoint of peculiar adaptability to the structural characteristics of the trailer here described.

With the trailer thus devised to withstand shocks arising both from the road and the handling of the towing vehicle, it will be seen that it is well adapted to take loads of comparatively great weight, in spite of the relatively few number and lightness of parts.

Other objects and novel features of the invention will be made apparent in the following detailed description, reference being had to the accompanying drawings, in which:

Fig. 3 is an enlarged section on line 3—3 of Fig. 2;

Fig. 4 is a fragmentary, top plan view of Fig. 3, parts being shown in section as indicated on line 4—4 of said figure;

Fig. 5 is an enlarged section on line 5—5 of Fig. 3;

Fig. 6 is an enlarged elevation, partly in broken away section, of the trailer as viewed from the right of Fig. 1;

Fig. 7 is a section on line 7—7 of Fig. 6;

Fig. 8 is a section on line 8—8 of Fig. 6;

Fig. 9 is a section on line 9—9 of Fig. 6;

Fig. 10 is a section on line 10—10 of Fig. 9; and

Fig. 11 is a section on line 11—11 of Fig. 8.

Figure 1:
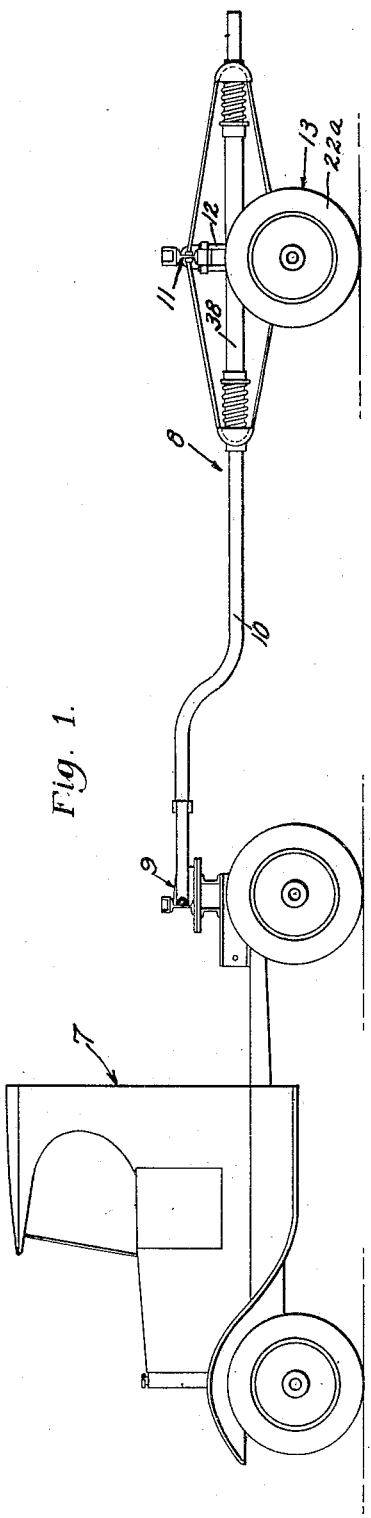
Fig. 1 is a side elevation of an embodiment of my invention.
Figure 2:
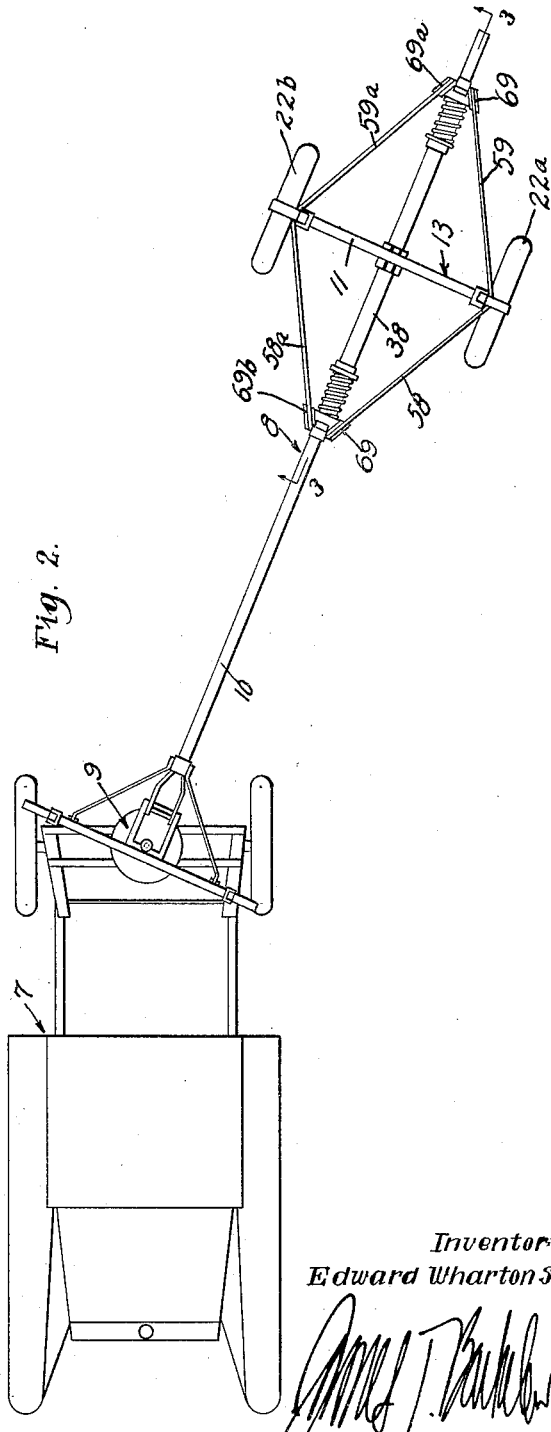
Fig. 2 is a top plan view of Fig. 1 but showing the trailer turned at an angle with respect to the towing vehicle.

In Figs. 1 and 2, numeral 7 indicates generally a towing vehicle, numeral 8 indicates generally a trailer, and numeral 9 indicates generally the coupling between the towing vehicle and trailer.

The body of the trailer may be considered as made up of pole or tongue 10 (preferably though not necessarily, of cylindrical, tubular formation), bolster 11 and means generally indicated at 12 for connecting the bolster and pole to the running gear generally indicated at 13. This particular make-up of the body is not essential to the invention, considered in its broader aspects, but will serve as a typical embodiment from an understanding of which those skilled in the art may readily see how the invention may be applied to differing structures. However, there are certain points of novelty in the body structure which are the subject-matter of certain claims.

In the illustrated embodiment of the invention, one element 14 of the connecting means 12 serves also as a housing and retention mean for the transversely arranged riding springs 15 whereby the body is spring-supported from running gear 13. Member 14 is arranged transversely with respect to pole 10 and preferably is directly beneath and parallel with bolster 11. It is of channel cross-section and has an upwardly extending arcuate portion 16 into which the ends of the springs 15 extend partially, said spring ends being spaced somewhat apart to provide a central compartment 17. Springs 15 are held to member 14 by U-bolts 18 in the usual manner, this cross-member and spring assembly being standard to a well known make of car.

The free ends of springs 15 are shackled in the usual manner at 19 to brackets 20, these brackets being welded or otherwise suitably positioned on axle housing 21. While the axle and housing assembly are not essential to the carrying out of my invention and the showing thereof is not to be considered as in any way limitative on my broader claims, I will describe with some particularity this assembly since it has certain features of advantage, particularly as regards simplicity of construction and assembly. The wheels are indicated at 22 and their axles at 23, but it will be necessary to describe only one wheel and its axle.

The end of axle 23 is fluted at 24 and carries a tubular thimble 25 having a key 26 fitted within one of the flutes. A bearing 27 for axle 23 is disposed within housing 21, said bearing having the additional function of a limit or stop collar, as will appear. Bearing 27 is slipped over axle 23 ahead of thimble 25 before the axle is installed in the housing, thimble 25 being thrust to the left, as viewed in Fig. 9, until the reduced portion or neck 28 of the axle is exposed. The two complementary arcuate keys 29 are then fitted around neck 28, these keys extending radially beyond the peripheral face of the axle. Thimble 25 also is countersunk at 30 so it may thereafter be moved to the right and into the position of Fig. 9 to overhang keys 29 and hold them in assembly with the axle. The assembly so far described is then thrust into housing 21 and bearing 27 is moved to such a position that its radially extending holes 31 are in register with housing holes 32. Cap screws 33 are then threaded through the housing and into holes 31, bearing 27 thereby being held against movement with relation to the housing. The end of thimble 25 engages bearing 27, movement of the thimble to the left, as viewed in Fig. 9, thus being limited, and since keys 29 shoulder against the bottom wall of countersink 30 and since neck 28 is held between these keys, it follows that movement of axle 23 to the left, as viewed in this figure, is limited.

The outer end of axle 23 extends through a bearing generally designated at 34, which bearing is held against movement through the housing by any suitable means such as shoulder 35 and projection 36, and carries wheel 22. Axle 23 is held from movement to the right as viewed in Figs. 6 and 9 either by end contact with the other axle or by a thrust bearing 37 interposed between the housing and wheel.

It is desirable, though not necessary, that connecting means 12 be of such a nature that the pole 10 may be shifted with respect to the running gear so as to vary the effective length of the trailer, though this adjustment is not essential to the invention, considered in its broader aspects.

Sleeve 38 encircles pole 10, being shiftable longitudinally therealong, carries bolster 11 and its associated members, and, indirectly, supports members 14 and springs 15. Accordingly, by sliding pole 10 through sleeve 38, the effective length of the trailer may be varied, as will be readily understood. In order to hold the pole and sleeve in positions to which they have been adjusted, I provide limit collars 39 at each end of the sleeve and drop pins 40 through holes 41 in these collars and registering holes 42 in the pole, there being a series of holes 42 in order that the sleeve may be positioned anywhere along the pole, within reasonable limits.

By virtue of the arrangement described above, it will be seen that, in effect, sleeve 38 supports the running gear and its associated parts, so the assembly is bodily movable with respect to the pole. The sleeve forms a very effective reinforcement for the pole along a considerable portion of its extent, aiding greatly in resisting bending strains to which the pole is exposed, particularly when the loaded trailer is making a turn. It will be noted that the sleeve and elements supported thereby, while being held by collars 39 from movement longitudinally along the pole, are capable of axial rotation about said pole, this being a feature of advantage in allowing the trailer running gear to follow, without undue torsional strain on any parts, roads having variational crown characteristics, as will be readily apparent.

Fitted within compartment 17 is a filler block 43, and this block has an arcuate lower face 44 adapted to fit over sleeve 38. A two-part clamping casting 45 is interposed between bolster 11, which is preferably an I-beam, and member 14. Casting 45 is divided longitudinally to provide two similar halves 46, each half including a depending flange 47 (Fig. 3) adapted to extend over the side face of member 14 and being cut away at 48 to take the lower flange of the I-beam. The upper extremities of halves 46 engage opposite sides of the web of the I-beam, and bolts 49 and 50 serve to clamp the casting halves together about and to the bolster, while flanges 47 position the casting on member 14 so as to prevent transverse displacement. As noted by reference to Fig. 6, bolts 50 extend through the web of the bolster, while bolt 49 extends through the casting halves at a point below the bolster.

Preferably, a strip of belting 51 or other suitable material, is fitted between the upper, arcuate face of member 14 and the lower and complementarily arcuate faces 52 of casting halves 46. The lower face of filler block 43 preferably extends below the edges of the flanges 53 of member 14, and U-bolts 54 are passed about sleeve 38 and through ears or lugs 54a on casting halves 46. By taking up these U-bolts, it will be seen that the sleeve, filler, member 14 and casting 45 are drawn tightly together, and held against relative displacement. Leather 51 serves to allow the complete taking-up of the U-bolts without tending to fracture the castings by reason of unevenness of opposed surfaces.

It will be seen that the bolster and springs lie normally in the vertical axial plane A of the axle 23, this axial plane being approximately at right angles to the longitudinal axis of the pole. The springs, of course, form the usual resilient connection between the body and wheels of the vehicle, but in the absence of counteracting means, severe road shocks or sudden contact of the wheels with obstructions such as curbs or loading platforms would so tend to shift or rock the running gear longitudinally with respect to the body as to distort or twist the springs and to overstrain the axle and wheels in a manner to cause relatively early failure of the device. I have provided means whereby these road shocks are effectively counteracted, and this is done without in any way minimizing the effect of the load supporting springs, in fact, the action of these springs is controlled in a manner to render them more highly efficient.

Generally described, the steadying and shock absorbing system may be considered as the application of fore and aft tension members to resist yieldingly longitudinal displacement of the running gear with respect to the body, the fore and aft resistance to displacement being such that the whole system is balanced and tends normally to maintain the wheel axles directly beneath the supporting springs. However, there is sufficient resiliency in the balancing structure to allow slight displacement so as to avoid the disastrous effects of rigid connections when exposed to sudden shock and jar.

Adjustable stop collars 55 threadably engage sleeve 38 at opposite sides of member 43 while attachment members 56 are slidably mounted on the sleeve and are spaced longitudinally from said collars by springs 57. The tension members are secured at one end to brackets 20 or, in effect, to the running gear and at the other end are applied to the sliding members so any tendency of the running gear to rotate about its spring support causes longitudinal sliding movement of one or the other of the slides 56, this sliding movement being yieldably resisted by the associated spring, while the opposite slide is acted upon by its spring in a manner to take up the opposed tension member and maintain it taut.

While the exact nature of the tension members connecting the sliding member and running gear is not a limitation of the invention, considered in its broader aspects, it is preferable that they be flexible, as in such form they may be applied more readily to the structure, particularly a structure of the individual type here shown, and they adjust themselves to changes of angularity without any tendency to bind at points of connection.

I have also shown the tension members at a given side of the supporting spring as being applied to a single sliding member on sleeve 38, this arrangement reducing the number of parts and contributing to the assurance of a balance effect, though it is not to be construed as limitative on the invention. As viewed in plan (see Fig. 2), the two forward tension members 58 are alike in nature, disposition and attachment, as is also true of the rearward tension members 59, and I will therefore describe in detail only one forward and one rear tension member.

Referring to Fig. 3, it will be seen that tension members 58 and 59 are in the form of cables. As a matter of convenience, members 58 and 59 may be made up of a single cable, clamped midway of its length (see Fig. 8) to bolster 11. This clamping is of such a nature that no cable movement through the bolster is possible, and the stretches of cable 58 and 59 may therefore be considered as entirely independent cables. As will be noted by reference to Figs. 8 and 11, the cable extends through an aperture 60 in the web of bolster 11 and is drawn over the channeled, curved face 61 of the head 62 of casting 63. The leg 64 of the casting is riveted at 65 to the bolster web and the longer portion 66 of the head extends through aperture 60. A clamping bar 67 and U-bolt 68 serve to clamp the cable tightly to casting 63 and hence to hold it against displacement with respect to the bolster.

Cable 59 is passed over the wing 69 which is integral with the cylindrical tubular portion 70 of the rearward slide member 56, said wing being arcuate and having a channel 71 to receive the cable. The wing is preferably angularly disposed with respect to the longitudinal axis of the pole so the cable may stretch without being sharply bent towards bracket 20.

While connection of the cable to the bracket may be made in any desired manner, in Figs. 3 and 5 I have shown a typical method wherein an angular casting 72 is bolted at 73 to bracket 20, cable 59 being clamped to the casting by U-bolts or clips 74. Member 56 has a wing 69a fashioned similarly to wing 69 and adapted to receive the other rearward tension member 59a (see Fig. 2).

Cable 58 extends from clamp 63 over the forward slide member 56 which is fashioned exactly as is the rearward slide member, and is secured to the forward end of bracket 20 by clamp 72a, similar to clamp 72; and the forward slide member has a wing 69b, similar to wing 69a adapted to receive the other forward tension member 58a (see Fig. 2).

Collars 55, which preferably have radially extending ways 75 for the reception of turning bars, are threaded along sleeve 38 to bring springs 57 and hence the tension cables under predetermined tension, the adjustment being such that the entire system is balanced and tends to keep axle housing 21 directly under cross member 43 so there is no undesirable distortion of spring 15. In the event of a shock which tends to rock wheels 22 rearwardly from beneath member 43, which action would tend to twist or distort springs 15 and generally reduce the efficiency of the structure and lessen its useful life, such movement is checked by reason of the forward slide member 56 being resisted in movement to the right (Fig. 3) by the forward spring 57. Of course, a certain amount of this movement is allowed by the spring in order that the checking or hold-back may not be too abrupt, but said spring immediately returns the running gear to normal position as soon as the force of the shock has lessened. Such movement as the running gear may have towards the rear under the imposition of such a shock, allows like movement of the rearward cables 59 and 59a, but the rearward spring 57 acts against the rearward slide member 56 in a manner to maintain cables 59 taut and then acts to check or retard the rebound of the running gear in its return towards normal position. During such movement, springs 15 are enabled to function in their normal manner, as will be readily understood.

Should the trailer be moved backwardly so wheels 22 contact with an obstruction which tends to swing the running gear forwardly beneath the trailer, the opposite action of the tension members is had, that is, the rearward spring 57 yieldably resists this movement and the forward spring 57 maintains cables 58, 58a taut and checks the rebound action of the running gear.

When springs 15 flex in a manner to lessen the vertically measured distance between housing 21 and pole 10, both springs 57 act in a manner to spread members 56 apart, thereby taking up on all the tension cables. The tension cables then act to check or snub the rebound action which follows. Of course, collars 55 may be adjusted to vary the tension of springs 57 and thereby adapt the system to various loading conditions.

It is preferable that the tension cables have no sliding movement over members 56 so said cables may not be exposed to undue wear at these points. I therefore prefer to mount members 56 with loose fit on sleeve 38 (see Figs. 3 and 4) so they may be capable of horizontal and vertical rocking movement to compensate for the bodily movement of the lower tension members.

It will be noted that in taking shocks directed horizontally against the wheels, the coil springs act singly to check the bodily movement of the running gear. However, both springs act to check vertical rebound of the spring-supported structure, the advantages of this double snubbing effect on the load supporting springs being self-evident. Furthermore, the arrangement is such that the greater the rebound, the greater is the snubbing action of the coil spring, while variances in load on the transverse spring are automatically compensated through said coil springs.

As a still further feature, when only one wheel strikes an obstruction, the tendency of the running gear to twist about a vertical axis is offset by the action of both coil springs. For instance, consider Figure 2 and assume that wheel 22a, only, strikes an obstruction tending to twist the running gear in a counterclockwise direction. Cables 58 and 59a, in effect, are put under increased tension, bringing both the fore and aft coil springs into play to resist longitudinal movement of said cables and thereby to resist twisting movement of the running gear. And it will be noted that the two springs act oppositely on opposite ends of the axle, the resistant force thus being applied in the most advantageous manner. At the same time, it will be noted in the example given above that cables 58a and 59 are ineffective to counteract the correctional tendencies of cables 58 and 59a, as would be the case if they were longitudinally rigid. Therefore it may be said that the various tension members are individually effective on the running gear.

It will be noted that member 14 is tied near its ends to bolster 11 by short I-beams 14a, there thus being three-point connection between said member and bolster.

Coupling 9 may be of any suitable type, though I have here illustrated a form which is particularly well adapted to the purpose.

It will be noted that although the structure of the trailer is relatively light and is such that it may be easily handled in situations where the use of a more cumbersome and weighty trailer would be prohibited or inefficient, it is able to withstand loads and usage which usually call for much heavier and more cumbersome trailers. With the combined qualities of lightness, mobility, and ability to carry heavy loads and withstand rough usage, it will be seen that the trailer has an exceedingly wide range of utility.

It will be understood the drawings and description are to be considered merely as illustrative of and not restrictive on the broader claims appended hereto, for various changes in design, structure and arrangement may be made without departing from the spirit and scope of said claims.

I claim:

1. In a trailer, a pole, a sleeve slidable along said pole, releasable means for holding the sleeve from sliding along said pole, running gear operatively connected to said sleeve through riding springs and slidable bodily with said sleeve along said pole, a member slidable along said sleeve towards and away from the riding springs, a spring adapted to resist movement of the sliding member towards the riding springs, and a tension member extending between and applied to the sliding member and running gear.

2. In a vehicle, a pole, springs applied to the pole, running gear connected to said pole through the springs, a member capable of being rocked with respect to the axis of the pole and being slidable along said pole towards and away from the springs, a coil spring adapted to resist movement of the sliding member towards the first mentioned springs, and a tension member extending between and applied to the sliding member and running gear.

3. In a vehicle embodying a body, running gear including two axially alined wheels, springs connecting the body and running gear whereby the body is spring-supported from the running gear, a pair of tension means applied to the running gear and extending, one each, from opposite sides of the vertical axial plane of the wheels to the body, each tension means including a resilient member tending to resist longitudinal displacement of the running gear with respect to the body in the direction opposite to that from which it extends with respect to said axial plane.

4. In a vehicle embodying a body, running gear including two axially alined wheels, springs connecting the body and running gear whereby the body is spring-supported from the running gear, a pair of flexible tension means applied to the running gear and extending, one each, from opposite sides of the vertical axial plane of the wheels to the body, each tension means including a resilient member tending to resist longitudinal displacement of the running gear with respect to the body in the direction opposite to that from which it extends with respect to said axial plane.

5. In a vehicle embodying a body, running gear including two axially alined wheels, springs connecting the body and running gear whereby the body is spring-supported from the running gear, a pair of tension members applied to the running gear at points spaced apart longitudinally of the wheel axis and extending from the same side of the vertical axial plane of the wheels towards the body, said members having independent application to the body whereby they are capable of relative movement and a single resilient member acting between said body and both of said tension members to resist bodily displacement of the running gear with respect to the body in a direction longitudinally of the body.

6. In a vehicle embodying a body, running gear including two wheels, and springs connecting the body and running gear whereby the body is spring supported on the running gear, a pair of coil springs on the body spaced apart longitudinally of the body and positioned at opposite sides of the vertical axial plane of the wheels, tension members extending between and applied, in effect, to said coil springs and said running gear, said coil springs acting selectively through said tension members to resist bodily displacement of the running gear horizontally in given directions with respect to the body when substantially horizontally directed shocks are taken approximately simultaneously by the two wheels, and acting in unison to check vertical rebound of the spring-supported body.

7. In a vehicle embodying a body, running gear including two wheels, and springs connecting the body and running gear whereby the body is spring supported on the running gear, a pair of coil springs on the body spaced apart longitudinally of the body and positioned at opposite sides of the vertical axial plane of the wheels, tension members extending between and applied, in effect, to said coil springs and said running gear, said coil springs acting selectively through said tension members to resist bodily displacement of the running gear horizontally in given directions with respect to the body when substantially horizontally directed shocks are taken approximately simultaneously by the two wheels, and acting in unison to check movement of the gear about a vertical axis when such shocks are taken by only one of said wheels.

8. In a vehicle, a body including a pole, running gear including two wheels, springs extending transversely of the body and connecting the pole and running gear and whereby the body is spring-supported from said running gear, a coil spring on the pole at a point spaced longitudinally therealong from the transverse springs, a stop member on the pole holding said transverse and coil springs in such spaced relation, a slide on said pole, said coil spring acting on said slide to hold it yieldingly against movement towards said transverse springs, a cable anchored at one end to the body and at the other end to the running gear, said cable being applied at a point intermediate its ends to said slide.

9. In a vehicle, a body including a pole, running gear including two wheels, springs extending transversely of the body and connecting the pole and running gear and whereby the body is spring-supported from said running gear a coil spring on the pole at a point spaced longitudinally therealong from the transverse springs, a stop member on the pole holding said transverse and coil springs in such spaced relation, a slide on said pole, said coil spring acting on said slide to hold it yieldingly against movement towards said transverse springs, a cable anchored at one end to the body at a point above the pole and at the other end to the running gear at a point below the pole, the anchor points being substantially in vertical alinement, said cable being applied at a point intermediate its ends to said slide.

10. In a vehicle a body including a pole, running gear including two wheels, springs extending transversely of the body and connecting the pole and running gear and whereby the body is spring-supported from said running gear, a coil spring on the pole at a point spaced longitudinally therealong from the transverse springs, a stop member on the pole holding said transverse and coil springs in such spaced relation, said stop member being adjustable longitudinally along the pole, a slide on said pole, said coil spring acting on said slide to hold it yieldingly against movement towards said transverse springs, a cable anchored at one end to the body and at the other end to the running gear, said cable being applied at a point intermediate its ends to said slide.

11. In a vehicle, a body including a pole, running gear including two wheels, springs extending transversely of the body and connecting the pole and running gear and whereby the body is spring supported from said running gear, a pair of coil springs on the pole at points spaced longitudinally therealong from the transverse springs, one coil spring being at one side of the transverse springs and the other coil spring being at the opposite side of the transverse springs, means for holding said transverse and coil springs in such spaced relation, a pair of slides on said pole and associated, one each, with said coil springs, said coil springs acting on their associated slides to hold them yieldably against movement towards said transverse springs, a pair of cables, each cable being anchored at one end to the body and at the other end to the running gear at opposite sides of the transverse springs, said cables being applied at points intermediate their ends one to each of said slides.

12. In a vehicle, a pole, a sleeve on the pole and normally rotatable thereabout, running gear operatively connected to the sleeve through transverse riding springs and rotatable with the sleeve about the pole, a member slidable along said sleeve towards and away from the transverse springs, a spring adapted to resist movement of the sliding member towards the transverse springs, and a tension member extending between and applied to the sliding member and running gear.

13. In a vehicle, a pole, transverse riding springs operatively connected to the pole, running gear connected to the pole through the springs, a member slidable along the pole towards and away from the riding springs, a coil spring adapted to resist movement of the sliding member toward the first mentioned springs, and a pair of flexible tension members, one each on opposite sides of the pole, said members extending between and being applied to the sliding member and running gear.

14. In a vehicle, a pole, transverse riding springs operatively connected to the pole, running gear connected to the pole through the springs, a pair of members on the pole at opposite sides of the springs and slidable towards and away from said springs, a pair of coil springs, one for each member, adapted to resist movement of their associated sliding members toward the riding springs, and two pairs of flexible tension members, the tension members of a given pair being arranged one each on opposite sides of the pole and extending between and being applied to the running gear and one of the sliding members, and the tension members of the other pair being arranged one each on opposite sides of the pole and extending between and being applied to the running gear and the other sliding member.

15. In a vehicle, embodying a body, running gear, and an operative connection between the running gear and body; a pair of tension members, one each at opposite sides of the median plane of the body and extending between and being applied to the body and running gear, said tension members being individually effective on the running gear, and spring means for tensioning said tension members.

16. In a vehicle embodying a body, running gear, and an operative connection between the running gear and body; two pairs of tension members connected to the running gear, the members of each pair being arranged at opposite sides of the median plane of the body, and the pairs extending, one each, to the body at opposite sides of the running gear, said tension members being individually effective on the running gear, and spring means for tensioning the individual tension members.

EDWARD WHARTON SHAW.